US007986056B2

(12) United States Patent
Augur

(10) Patent No.: US 7,986,056 B2
(45) Date of Patent: Jul. 26, 2011

(54) ELECTRICAL OUTLET ADAPTER WITH AUTOMATIC POWER-ON AND POWER-OFF OF PERIPHERAL OUTLETS

(76) Inventor: Dennis Harold Augur, Fulton, MO (US)

( * ) Notice: Subject to any disclaimer, the term of this patent is extended or adjusted under 35 U.S.C. 154(b) by 121 days.

(21) Appl. No.: 12/171,054

(22) Filed: Jul. 10, 2008

(65) Prior Publication Data

US 2009/0253307 A1 Oct. 8, 2009

Related U.S. Application Data

(60) Provisional application No. 61/042,081, filed on Apr. 3, 2008.

(51) Int. Cl.
*H02J 3/14* (2006.01)

(52) U.S. Cl. .......... 307/39

(58) Field of Classification Search .......... 307/31–41; 340/500, 540, 657, 3.1
See application file for complete search history.

(56) References Cited

U.S. PATENT DOCUMENTS

| | | | | |
|---|---|---|---|---|
| 5,699,051 | A * | 12/1997 | Billig et al. | 340/657 |
| 5,731,947 | A * | 3/1998 | Hirose | 361/160 |
| 6,759,763 | B2 * | 7/2004 | Barton | 307/39 |
| 7,132,763 | B2 * | 11/2006 | Rendic | 307/31 |
| 7,193,335 | B2 * | 3/2007 | Palmer et al. | 307/39 |

* cited by examiner

*Primary Examiner* — Albert W Paladini
(74) *Attorney, Agent, or Firm* — R. Scott Kimsey

(57) ABSTRACT

The present invention provides a device for reducing energy waste. One aspect of the present invention provides an electrical adapter designed to mate with a pre-existing electrical outlet. The adapter includes a plurality of outlets along a surface thereof. At least one primary outlet is provided, the primary outlet controlling peripheral outlets so that when the power drawn by a device plugged into the primary outlet drops below a predetermined threshold, the power to the peripheral outlets is interrupted.

18 Claims, 2 Drawing Sheets

ELECTRICAL OUTLET ADAPTER WITH AUTOMATIC POWER-ON AND POWER-OFF OF PERIPHERAL OUTLETS

RELATED APPLICATIONS

This Application claims priority of U.S. Provisional Patent Application No. 61/042,081, filed on Apr. 3, 2008.

BACKGROUND OF THE INVENTION

1. Field of the Invention

The present invention relates generally to outlets or adapters for plugging in electric or electronic devices, and more specifically to a multi-outlet adapter for powering down peripherals plugged thereinto when a primary device is powered down.

2. Description of the Prior Art

As energy costs rise and non-renewable energy sources dwindle, conservation is increasingly at the forefront of the public consciousness. In both commercial and residential settings, individuals seek ways to reduce energy costs and to reduce their footprint on the environment. Many cost-cutting or conservation practices are incremental and serve as components of a larger, eco-friendly lifestyle.

Many electronic devices serve as primary devices to which other electronic devices are attached as peripherals. For example, a computer system may have a printer, scanner, monitor, external drive, or other device attached thereto. Likewise, an entertainment system may include a receiver, CD and/or DVD player, a television, separately-powered speakers, or other components. A common feature of many such peripheral devices is that they serve no purpose when the primary device is not in use. Nevertheless, many people leave the peripheral devices turned on when the primary device is not in use. This is sometimes done inadvertently, and otherwise done to avoid the inconvenience of turning off all of the peripheral devices. Each peripheral device left on when the primary device is not in use consumes energy unnecessarily. This leads to an increased cost to the consumer and furthermore wastes energy.

An attempt has been made to address this problem in the form of a power strip that automatically powers-down peripheral devices when a primary device is powered-down. Such a device suffers from disadvantages, however. For example, a power strip type device is freestanding, usually on a floor, and therefore takes up space and clutters the area behind or around electronic equipment. Furthermore, a power strip has cord that connects to a plug so that the power strip can be plugged into a wall outlet. This cord is another source of clutter and can become entangled with multiple cords already behind or around electronic equipment.

What is needed, therefore, is a device adapted to replace a typical electrical outlet and adapted to provide for the automatic shut down of peripheral devices when a primary device is powered down. Further, it is desirable that such a device automatically provide power to peripherals once a primary device is turned on.

SUMMARY OF THE INVENTION

The present invention provides a device for reducing energy waste. One aspect of the present invention provides an electrical adapter designed to mate with a pre-existing electrical outlet. The adapter includes a plurality of outlets along a surface thereof. At least one primary outlet is provided, the primary outlet controlling peripheral outlets so that when the power drawn by a device plugged into the primary outlet drops below a predetermined threshold, the power to the peripheral outlets is interrupted.

Another aspect of the present invention includes a sensor for determining when the power drawn by the device plugged into the primary outlet has dropped below a predetermined threshold.

Another aspect of the present invention provides a device for reducing energy waste having a front surface and a rear surface. The front surface of the device includes at least one primary outlet disposed therealong, as well as at least one peripheral outlet disposed therealong. A plug extending from the rear surface of the device is adapted for plugging the device into a standard electrical outlet. The primary outlet controls the peripheral outlet(s) such that when the power drawn by the device plugged into the primary outlet drops below a predetermined threshold, power to the peripheral outlet(s) is interrupted.

In another aspect of the present invention, the device includes a fastener extending from the rear surface for attaching the device to an electrical outlet.

In yet another aspect of the present invention, the device includes an adjustment portion for adjusting the threshold at which the device interrupts power to the peripheral outlet(s).

In another aspect of the present invention, the device includes an LCD for displaying threshold values to a user thereof.

In another aspect of the present invention, the device includes a surge protection portion for protecting equipment plugged into the device from electrical surges.

In another aspect of the present invention, a device for reducing energy waste is provided, the device including a housing having front and rear surfaces, a primary outlet disposed along the front surface, three peripheral outlets disposed along the front surface, and two independent outlets disposed along the front surface. The device further includes a fastener for attaching the device to an electrical outlet. The primary outlet controls the three peripheral outlets, while the independent outlets are always powered.

In another aspect of the present invention, the device includes an indicator for indicating when the peripheral outlets thereof are receiving power.

BRIEF DESCRIPTION OF THE DRAWING FIGURES

DETAILED DESCRIPTION OF THE PREFERRED EMBODIMENTS

Figure 1:
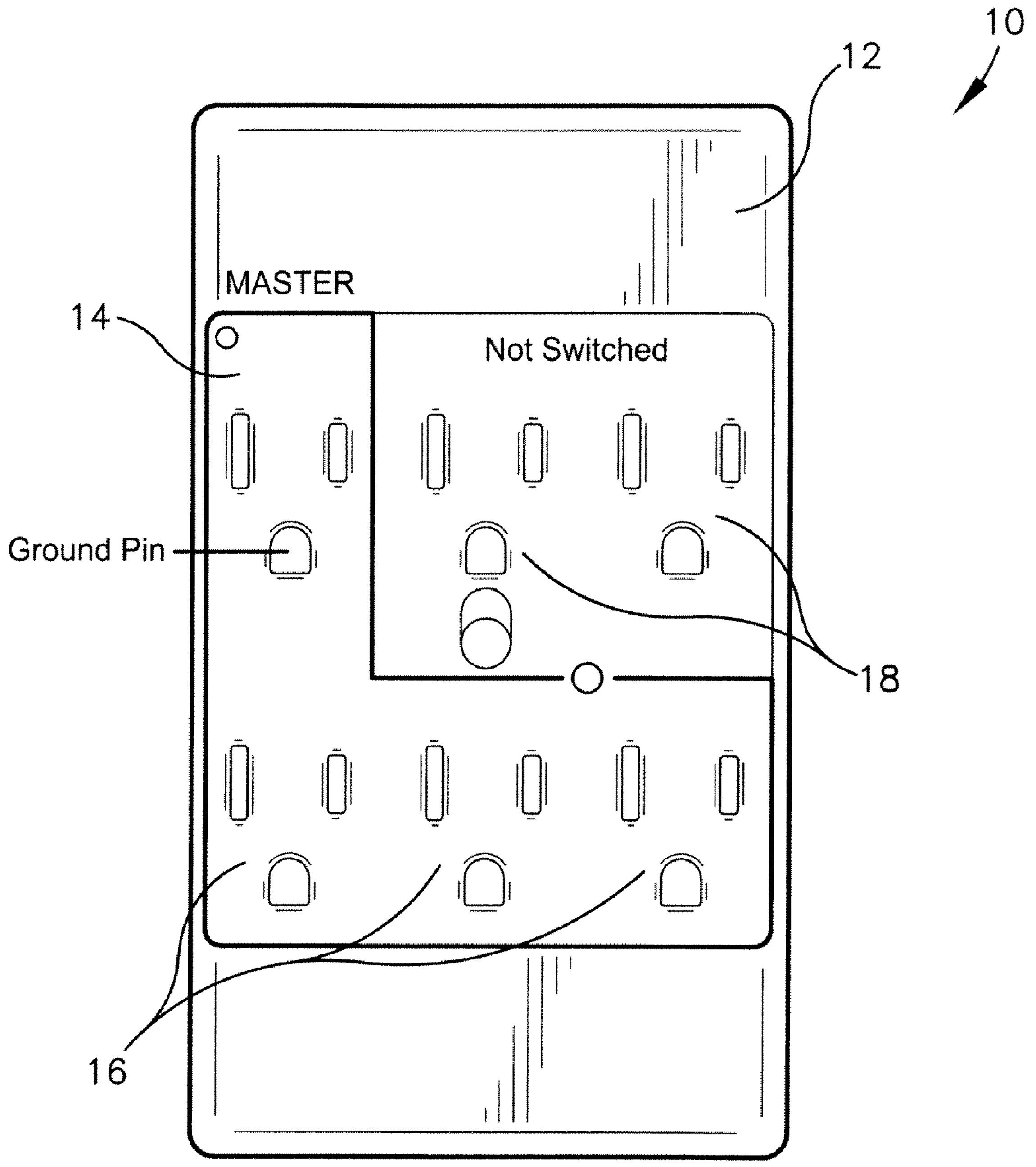
FIG. 1 is a front perspective view of one embodiment of a device constructed in accordance with the teachings of the present invention.

Turning now to the drawings, wherein like numerals indicate like parts, the numeral 10 indicates generally a six-outlet embodiment of the device of the present invention. This embodiment of device 10, shown in FIG. 1, also includes a housing 12, a primary outlet 14, three peripheral outlets 16, and two independent outlets 18. It is contemplated that the number and arrangement of such outlets may vary without departing from the spirit or scope of the present invention.

Housing 12 of device 10 may be constructed of any suitable material, and may be provided in any suitable size, shape, or configuration. An exemplary material suitable for use in the construction of housing 12 is polypropylene. A second exemplary material is polyvinyl chloride (PVC). Materials suitable for use in the construction of housings for electrical outlets, adapters, and the like are well known in the art.

Referring still to FIG. 1, a primary outlet 14 is provided for accepting a typical two- or three-prong plug from an electronic device. Primary outlet 14 includes, associated therewith, a sensor (described more fully below) that is able to sense the amount of current being drawn through primary outlet 14 to power a device plugged into primary outlet 14. Peripheral outlets 16 are also of the type typically utilized to accept a two- or three-prong plug from an electronic device. Peripheral outlets 16 are preferably in electronic communication with primary outlet 14 such that peripheral outlets 16 are controlled by primary outlet 14.

For example, when an electronic or other device is plugged into primary outlet 14, a sensor included in device 10 monitors the electrical usage of the electronic or other device by monitoring the current drawn through primary outlet 14. As such, device 10 is able to determine whether the device plugged into primary outlet 14 is on or off. When the device plugged into primary outlet 14 is turned on, device 10 also provides power to peripheral outlets 16 so that peripheral devices plugged into peripheral outlets 16 receive power. The devices plugged into peripheral outlets 16 may include, for example, a printer, scanner, and monitor associated with a computer plugged into primary outlet 14. When a device plugged into primary outlet 14 is turned off, a sensor associated with device 10 is able to determine that the device plugged into primary outlet 14 is either drawing no power or substantially less power. Device 10 will then stop providing power to peripheral outlets 16, causing the various devices plugged into peripheral outlets 16 to be turned off or powered down. As a result, energy and cost is saved because the peripheral devices are not consuming power when they clearly are not needed and will not be in use.

In addition to the functionality described above, it is preferred that a sensor associated with device 10 can also determine when a device that was previously off and plugged into primary outlet 14 has been turned on. This is again accomplished by monitoring the current flowing through primary outlet 14. When device 10 recognizes that the device plugged into primary outlet 14 has been turned on again, power is preferably provided to peripheral outlets 16. Thus, once the primary device is powered on, the peripheral devices also receive power without the need for the user to manually turn them on.

A sensor as described above may be set for a predetermined current threshold such that when the current drops below the threshold, the device plugged into primary outlet 14 is considered to be "off," and power to peripheral outlets 16 is interrupted. Depending on the threshold settings, it is not necessary that a device plugged into primary outlet 14 actually be off before power to peripheral outlets 16 is interrupted. Rather, the device plugged into primary outlet 14 may have simply moved into a standby mode, and the sensor associated with the present device may be set with a threshold such that moving into standby mode triggers the present device to cut power to peripheral outlets 16. It should be noted that such sensors for determining the amount of current passing through a circuit are known in the art.

The thresholds at which a sensor is set may be determined at the time of manufacture of the present device (i.e. set at the factory), or may be adjustable by a user of the present device. In some embodiments of the present invention, an LCD or other display may be provided so that the end user of the present device can see the precise threshold settings (and any other desirable information) displayed thereon.

Also included with the embodiment of device 10 shown in FIG. 1 are two independent outlets 18. Independent outlets 18 are preferably adapted to receive a typical two- or three-prong plug, and function as normal electrical outlets. That is, power is always provided to independent outlets 18. Thus, the on or off status of a device plugged into primary outlet 14 will not affect the delivery of power to independent outlets 18. Independent outlets 18 may therefore be used to power any devices that should be retained in an always on state, or that should only be powered down when a user of device 10 manually turns them off or unplugs them.

The rear of device 10 is preferably adapted to take the place of, or be inserted into, a standard two-outlet electrical wall outlet. As such, device 10 does not take up space on the floor of a room or other area in which it is being used, and does not include an electrical cord that must be plugged into an outlet, further creating clutter.

Figure 2:
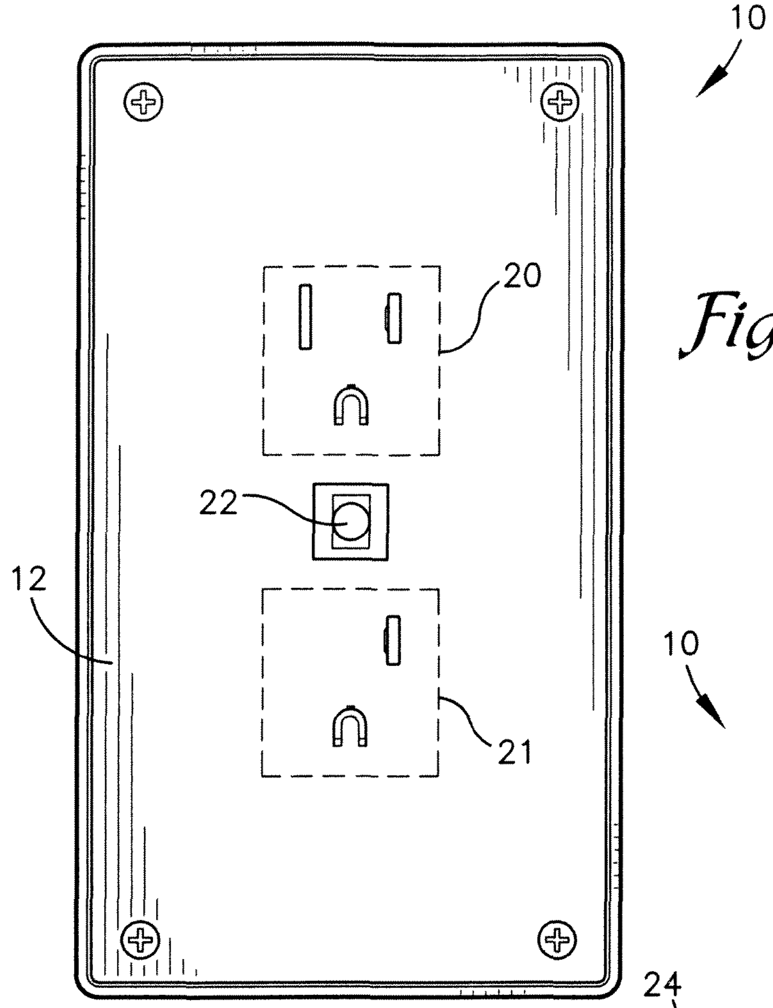
FIG. 2 is a rear view of one embodiment of a device constructed in accordance with the teachings of the present invention.

FIG. 2 provides a rear view of one embodiment of a device 10 constructed in accordance with the teachings of the present invention. In the embodiment shown, a housing 12 is provided, as with the embodiment of device 10 shown in FIG. 1 (in fact, the view shown in FIG. 2 is one possible configuration for the rear of the embodiment of device 10 shown in FIG. 1). Housing 12 is shown in FIG. 2 as having two parts, including a rear panel fastened to a front of housing 12 by four screws. It is contemplated, however, that housing 12 may also be constructed from a single, unitary piece of material molded into the proper shape or configuration.

Device 10 in FIG. 2 includes a three-pronged plug 20 and a modified two-pronged plug 21. It is preferred that three-pronged plug 20 and modified two-pronged plug 21 are sized, shaped, and spaced to mate with a typical two-outlet electrical wall outlet. Three-pronged plug 20 includes two upper prongs as well as a lower prong designed to serve as a ground (these prongs are known as the neutral, hot, and ground, and are used in polarized outlets). Modified two-pronged plug 21 includes one upper prong (the neutral prong) and the ground prong found in a typical three-pronged plug. There is no hot prong associated with modified two-pronged plug 21 so that current provided to peripheral outlets 16 is governed by primary outlet 14, which receives current via three-pronged plug 20. The principles of the present invention may, however, be implemented with a device adapted to mate with any suitable outlet—for example only three-pronged plug 20 may be present, with modified two-pronged plug 21 being eliminated). In the embodiment of device 10 shown in FIG. 2, a user of device 10 can simply plug device 10 directly into an existing wall outlet. No disassembly of the wall outlet is required. This embodiment provides for ease of use and reduces the risk of electrical shock to a user attempting to install device 10. Also shown in FIG. 2 is a opening 22 for a screw for fastening device 10 to a bracket within a wall outlet, thereby ensuring that, if desired, device 10 may be not only plugged into an existing wall outlet but securely affixed thereto.

Figure 3:
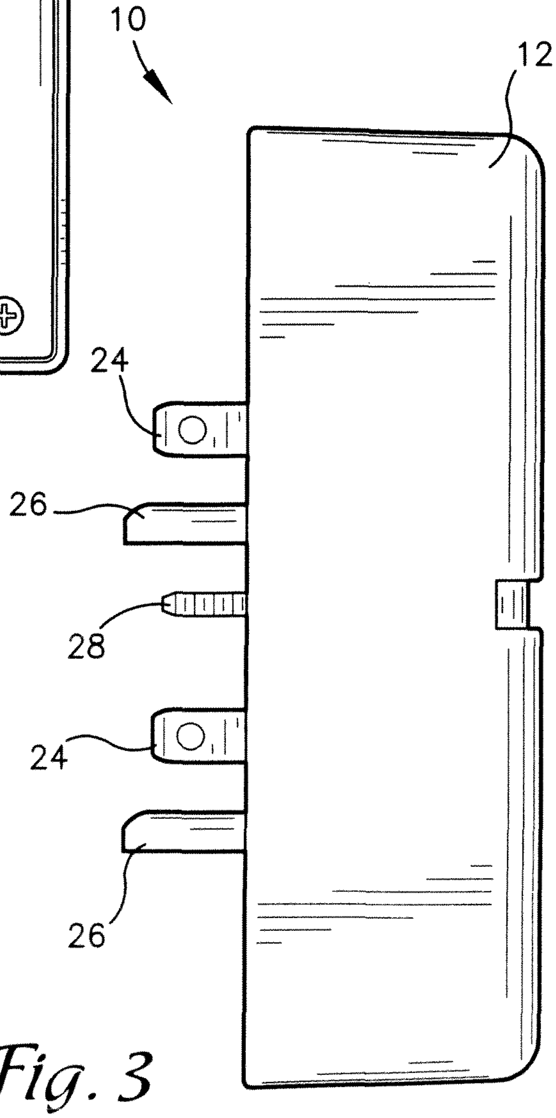
FIG. 3 is a side perspective view of one embodiment of a device constructed in accordance with the teachings of the present invention.

FIG. 3 provides a side view of an exemplary embodiment of device 10 of the present invention. The various prongs associated with the two three-pronged plugs 20 on the rear of device 10 are shown extending away from housing 12. Prongs 24 are the hot prongs associated with a plug adapted for use with a polarized outlet. Prongs 26 are the ground prongs. It is contemplated that two ground prongs 26 are not necessary in all implementations of the present device, and depending on the wiring of the device may not be desired in all implementations. In some implementations of the present device, in order to control the switched outlets, the high-side 110V pin corresponding to the three peripheral outlets 16 is not connected to the main power from the wall outlet with which device 10 is associated. This pin, if present, is non-operational in this implementation of the present device. Rather, the pin is internally switched via internal circuits. The pin can be eliminated without any change in function of this implementation of device 10. Variations on the number of prongs associated with the present device may be made without departing from the spirit or scope of the present invention. The neutral prongs are adjacent the hot prongs, but are not visible in FIG. 3. A Screw 28 is also shown in the figure. Screw 28 extends through opening 22 of device 10 and is used to secure device 10 to an electrical outlet. Although a screw is described above and shown in the drawings, any suitable fastener may be utilized.

The embodiments of device 10 described above are adapted to be plugged into a standard wall electrical outlet. It is contemplated, however, that other embodiments of the present device may be adapted to be wired directly into the existing electrical system of a residential or commercial structure (i.e. recess-mounted into, for example, a wall). In such an embodiment, device 10 would not include prongs on the rear thereof for mating with a standard electrical outlet. Rather, device 10 would include the necessary structure for wiring directly into an existing electrical system. It is contemplated that the various components, structures, and know-how for undertaking such a wiring are well known in the art.

The present device may also include a light-emitting diode (LED) or other indicator for signaling to a user thereof that peripheral outlets 16 are receiving power.

It should be further noted that the present device, in a preferred embodiment, does not include a secondary power switch for the user to turn on the present device. This eliminates an inconvenience to the user of the present device, who need only mount the device on a wall and plug various electronic devices into it. The present device is, then, continuously ready to supply power to primary and peripheral devices without the user actively utilizing a switch to turn the present device on.

Thus, the device described above meets a need for energy conservation, and further meets a need for reducing the clutter of wires, cords, and the like, thereby reducing fire and other hazards. It is contemplated that the device may be further modified by, for example, adding a surge protection feature, an uninterruptable power-supply feature, phone or cable outlets, and the like. Methods of making such modifications will be readily ascertainable by those of skill in the art upon reading this disclosure.

The detailed description set forth above is provided to aid those skilled in the art in practicing the present invention. The invention described and claimed herein, however, is not to be limited in scope by the specific embodiments disclosed because these embodiments are intended to be illustrative of several aspects of the invention. Any equivalent embodiments are intended to be within the scope of the present invention. Various modifications of the invention that do not depart from the spirit or scope of the present invention, in addition to those shown and described herein, will become apparent to those skilled in the art from the foregoing description. Such modifications are also intended to fall within the scope of the appended claims.

Having thus described the preferred embodiment of the invention, what is claimed as new and desired to be protected by Letters Patent includes the following:

1. A device for reducing energy waste comprising:
an electrical adapter sized and shaped to mate directly with a pre-existing electrical outlet, said adapter having a plurality of outlets disposed along a surface thereof,
wherein said plurality of outlets includes at least one primary outlet, said primary outlet controlling at least one other of said plurality of outlets such that when power consumed by a device plugged into said primary outlet drops below a predetermined threshold, the power provided to said at least one other of said plurality of outlets is interrupted,
and further wherein said device plugged into said primary outlet remains on but consumes less power than when at a fully-functional operational state when the power consumed by the device plugged into the primary outlet drops below a predetermined threshold.

2. The device according to claim 1 further comprising a sensor for determining when power consumed by a device plugged into said at least one primary outlet drops below said predetermined threshold.

3. A device for reducing energy waste comprising:
a housing having a front surface and a rear surface;
at least one primary outlet disposed along said front surface of said housing;
at least one peripheral outlet disposed along said front surface of said housing; and
a plug extending from said rear portion for plugging said device into a standard electrical outlet;
wherein said at least one primary outlet controls said at least one peripheral outlet such that when power consumed by a device plugged into said at least one primary outlet drops below a predetermined threshold, the power provided to said at least one peripheral outlet is interrupted,
and further wherein said device plugged into said primary outlet remains on but consumes less power than when at a fully-functional operational state when the power consumed by the device plugged into the primary outlet drops below a predetermined threshold.

4. The device according to claim 3 further comprising a fastener extending from said rear surface for attaching said device to an electrical outlet.

5. The device according to claim 3 further comprising a sensor for determining when power consumed by a device plugged into said at least one primary outlet drops below said predetermined threshold.

6. The device according to claim 3 further comprising an adjustment portion for adjusting the threshold at which said device interrupts power to said at least one peripheral outlet.

7. The device according to claim 6 further comprising an LCD for displaying threshold values to a user of said device.

8. The device according to claim 3 further comprising a surge protection portion for protecting equipment plugged into said device from electrical surges.

9. A device for reducing energy waste comprising:
a housing having a front surface and a rear surface;
a primary outlet disposed along a front surface thereof;
three peripheral outlets disposed along a front surface thereof;
two independent outlets disposed along a front surface thereof; and
a fastener for attaching said device to an electrical outlet,
wherein said primary outlet controls said three peripheral outlets such that when power consumed by a device plugged into said primary outlet drops below a predetermined threshold, the power provided to said three peripheral outlets is interrupted.

10. The device according to claim 9 further comprising:
a three-pronged plug extending from a rear surface thereof for mating with a standard three-socket electrical outlet.

11. The device according to claim 10 further comprising:
a modified two-pronged plug extending form a rear surface thereof for mating with the neutral and ground openings in a standard three-socket electrical outlet.

12. The device according claim 1, further comprising an indicator for indicating to a user thereof whether said peripheral outlets are receiving power.

13. The device according to claim 9 further comprising a surge protection portion for protecting equipment plugged into said device from electrical surges.

14. The device according to claim 9 wherein said device does not include a surge protection portion.

15. The device according to claim 9 wherein said device does not include a power switch for powering said device, said device being always ready to supply power to devices plugged thereinto when said device is attached to an electrical outlet.

16. The device according claim 3, further comprising an indicator for indicating to a user thereof whether said peripheral outlets are receiving power.

17. The device according claim 9, further comprising an indicator for indicating to a user thereof whether said peripheral outlets are receiving power.

18. The device according to claim 1 wherein the predetermined threshold is the threshold at which the device plugged into the primary outlet enters a mode selected from the group consisting of a sleep mode, a standby mode, and a power-saving mode.

* * * * *